(12) United States Patent
Robb et al.

(10) Patent No.: US 7,490,707 B2
(45) Date of Patent: *Feb. 17, 2009

(54) MAGNETORHEOLOGICAL FAN COUPLING

(75) Inventors: Neil E. Robb, Jackson, MI (US); Rick L. Boyer, Marshall, MI (US); Gary E. Hart, Indianapolis, IN (US)

(73) Assignee: BorgWarner Inc., Auburn Hills, MI (US)

( * ) Notice: Subject to any disclaimer, the term of this patent is extended or adjusted under 35 U.S.C. 154(b) by 288 days.

This patent is subject to a terminal disclaimer.

(21) Appl. No.: 11/163,629

(22) Filed: Oct. 25, 2005

(65) Prior Publication Data

US 2006/0272917 A1 Dec. 7, 2006

Related U.S. Application Data

(63) Continuation-in-part of application No. 10/908,965, filed on Jun. 2, 2005, now Pat. No. 7,364,025.

(51) Int. Cl.
*F16D 37/02* (2006.01)
*F16D 35/00* (2006.01)

(52) U.S. Cl. ............... 192/21.5; 192/58.4; 192/113.21; 192/113.24

(58) Field of Classification Search ............. 192/113.24
See application file for complete search history.

(56) References Cited

U.S. PATENT DOCUMENTS

| | | | | |
|---|---|---|---|---|
| 2,519,449 A * | 8/1950 | Findley | ..................... | 192/21.5 |
| 4,074,662 A | 2/1978 | Estes | | |
| 4,611,697 A * | 9/1986 | Okita et al. | ................. | 192/21.5 |
| 4,899,860 A * | 2/1990 | Diederich | ................ | 123/41.49 |
| 4,920,929 A * | 5/1990 | Bishop | .................... | 123/41.49 |
| 5,896,965 A | 4/1999 | Gopalswamy et al. | | |
| 6,021,747 A | 2/2000 | Gee et al. | | |
| 6,209,700 B1 | 4/2001 | Wogaman et al. | | |
| 6,290,043 B1 | 9/2001 | Ginder et al. | | |
| 6,318,531 B1 | 11/2001 | Usoro et al. | | |
| 6,394,244 B1 | 5/2002 | Dwivedi et al. | | |
| 6,543,396 B2 * | 4/2003 | Stretch et al. | ............ | 123/41.12 |
| 6,561,141 B2 * | 5/2003 | Stretch et al. | ............ | 123/41.12 |
| 6,585,092 B1 | 7/2003 | Smith et al. | | |
| 6,634,344 B2 | 10/2003 | Stretch | | |
| 7,083,032 B2 * | 8/2006 | Boyer | ...................... | 192/58.61 |
| 7,278,524 B2 * | 10/2007 | Boyer | ...................... | 192/58.61 |
| 2006/0272916 A1 * | 12/2006 | Robb et al. | ................ | 192/21.5 |

* cited by examiner

*Primary Examiner*—Rodney H Bonck
(74) *Attorney, Agent, or Firm*—John A. Artz

(57) ABSTRACT

A magnetorheological fan coupling (10) having a fan-drive subassembly (12), an electromagnet subassembly (14), and a magnetic medium (16). The fan-drive subassembly (12) includes an output member (22) and an input member (20) rotatably mounted around the output member (22) with the magnetic medium (16) therebetween. The magnetic medium (16) has a shear stress that can be adjusted by a magnetic flux (24) for transferring torque between the input member (20) and the output member (22). The electromagnet subassembly (14) includes a stationary electromagnet coil (62) for adjusting the shear stress of the magnetic medium (16) and regulating a torque transferred between the input member (20) and the output member (22).

3 Claims, 2 Drawing Sheets

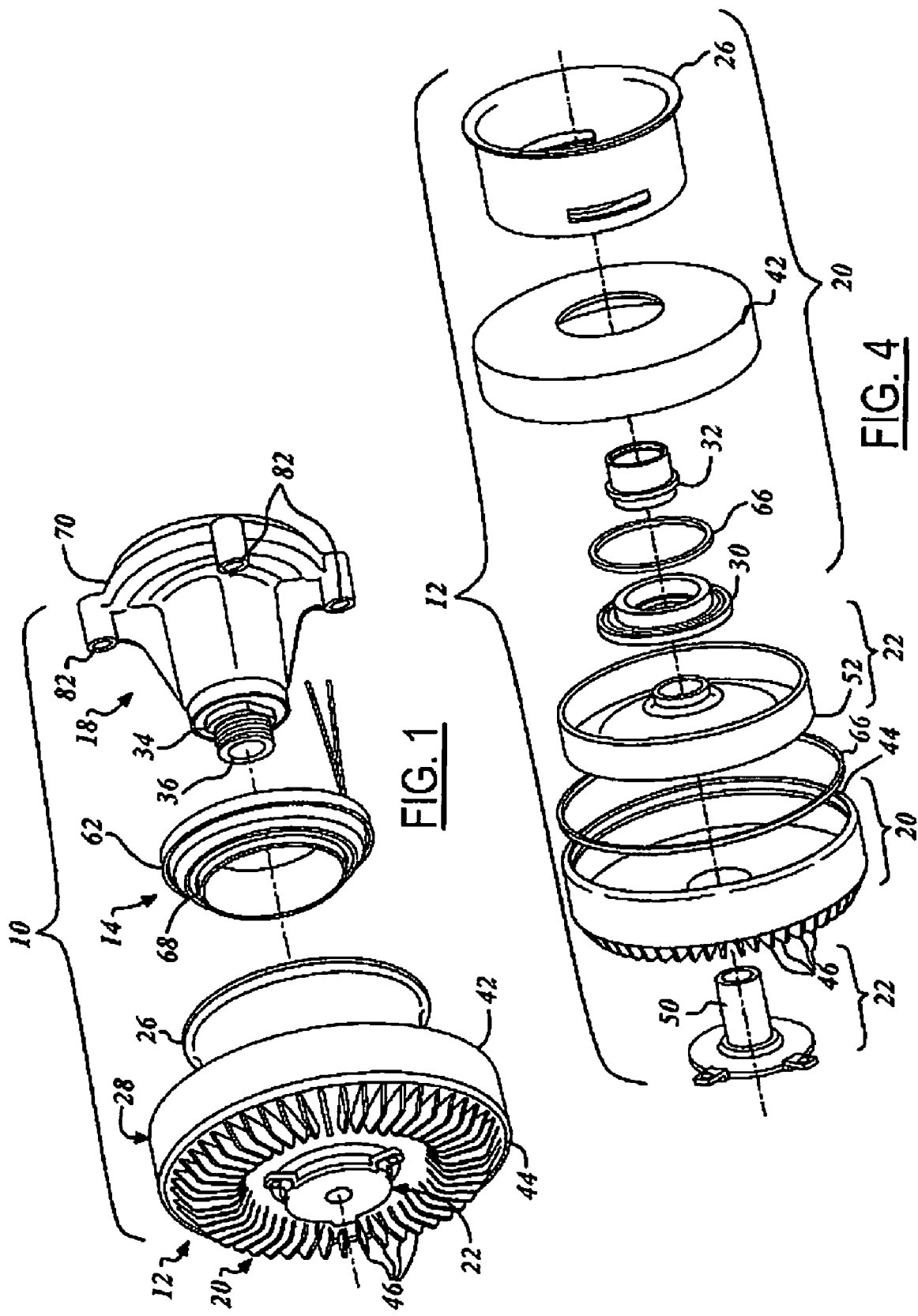

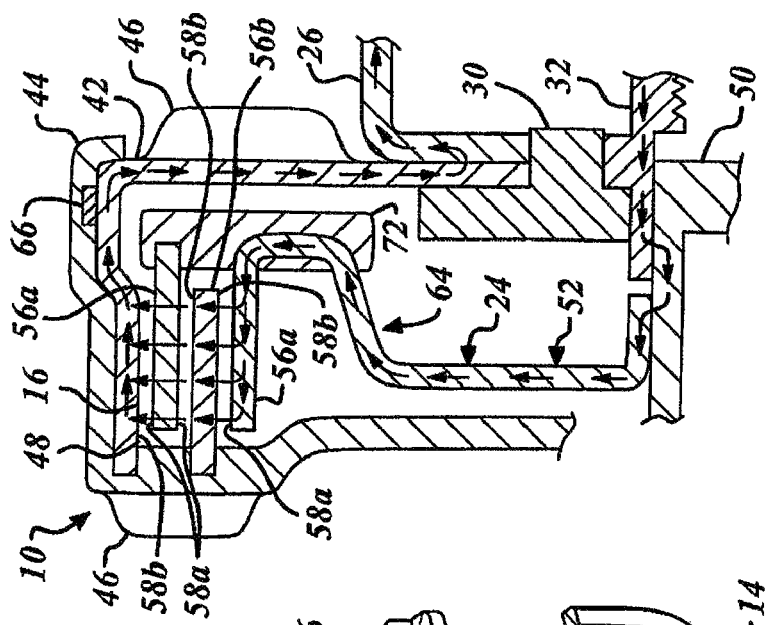

MAGNETORHEOLOGICAL FAN COUPLING

CROSS-REFERENCE TO RELATED APPLICATIONS

This application is a continuation-in-part of U.S. Ser. No. 10/908,965, filed on Jun. 2, 2005, now U.S. Pat. No. 7,364,025 entitled "MAGNETORHEOLOGICAL FAN COUPLING," and is related to U.S. Ser. No. 10/929,801, filed on Aug. 30, 2004, entitled "ELECTRONICALLY CONTROLLED FLUID COUPLING DEVICE", the disclosures of which are incorporated herein by reference.

TECHNICAL FIELD

The invention relates generally to engine cooling systems for vehicles, and more specifically to a magnetorheological fan coupling for an engine cooling system.

BACKGROUND ART

Viscous-fluid fan couplings for engine cooling systems play a significant role in conserving engine power and enhancing overall vehicle performance.

Electrically-actuated viscous fan couplings ("electrical fan couplings") have a somewhat high number of parts for providing a precisely-controlled output. Specifically, the typical electrical fan coupling includes a viscous fluid, a working chamber, a reservoir chamber, a series of valve mechanisms, and a computer that actuates the valve mechanisms for metering the flow of viscous fluid between the working chamber and the reservoir chamber. In this way, the computer can control the amount of fluid in the working chamber and selectively engage the coupling to provide a predetermined amount of output.

It would therefore be desirable to provide an improved fan coupling, particularly one having a robust construction comprised of generally few parts.

SUMMARY OF THE INVENTION

One advantage of the invention is that a magnetorheological fan coupling ("MR coupling") is provided that has a stable and robust construction for increasing the life of the MR coupling.

Another advantage of the invention is that an MR coupling is provided that has a relatively simple and compact construction with generally few components for decreasing the manufacturing cycle time, as well as the costs associated therewith.

Yet another advantage of the invention is that an MR coupling is provided that enhances the rejection of heat therein.

Still another advantage of the invention is that an MR coupling is provided that can be packaged within various sized applications for use in a variety of systems.

Yet another advantage of the invention is that an MR coupling is provided that utilizes a relatively low amount of power for moving between engaged and disengaged modes.

The above and other advantages of the invention are met by one or more embodiments of the present invention, which is an improvement over known viscous fluid fan couplings.

The present invention enables an MR coupling having a fan-drive subassembly, an electromagnet subassembly, and a magnetic medium. The fan-drive subassembly includes an output member and an input member rotatably mounted around the output member with the magnetic medium therebetween. The magnetic medium has a shear stress that can be adjusted by a magnetic flux for transferring torque between the input member and the output member. The electromagnet subassembly includes a stationary electromagnet coil for adjusting the shear stress of the magnetic medium and regulating the amount of torque transferred between the input member and the output member.

Other advantages and features of the present invention will become apparent from the following description of the invention, when viewed in accordance with the attached drawings and appended claims.

BRIEF DESCRIPTION OF THE DRAWINGS

FIG. 1 is a partially exploded perspective view of a magnetorheological fan coupling ("MR coupling"), illustrating the major subassemblies therein, according to a preferred embodiment of the present invention.

FIG. 2 is perspective cross-sectional view of the MR coupling shown in FIG. 1.

FIG. 3 is perspective cross-sectional view of the MR coupling shown in FIG. 1, according to another advantageous embodiment of the claimed invention.

FIG. 4 is a fully exploded perspective view of the MR coupling shown in FIG. 2.

BEST MODE(S) FOR CARRYING OUT THE INVENTION

Although the present invention may be used advantageously in coupling devices that have various configurations and applications, it is especially advantageous for driving a radiator cooling fan for an internal combustion engine. The present invention also is advantageous for concurrently transferring power to a waterpump subassembly, namely a series of impeller blades therein for pumping water through an engine block. Accordingly, the invention will be described below in connection therewith. However, it will be appreciated that the invention can be integrated within various other systems for other suitable applications as desired.

Referring to FIG. 1, there is shown a partially exploded view of a magnetorheological fan coupling 10 ("MR coupling"), according to one advantageous embodiment of the claimed invention. The MR coupling 10 generally is comprised of a fan-drive subassembly 12, an electromagnet subassembly 14 (best shown in FIG. 2), and a magnetic medium 16. The electromagnet subassembly 14 magnetizes the magnetic medium 16 and actuates the fan-drive subassembly 12 in an engaged mode, a disengaged mode, and a range of partially engaged modes. In this embodiment, as detailed below, the MR coupling 10 further includes the waterpump subassembly 18 for rotating impeller blades therein and pumping water through the engine block.

As detailed below and shown in FIG. 2, the fan-drive subassembly 12 has an inverted construction comprised of an input member 20 rotatably mounted around an output member 22. The output member 22 is selectively engaged with the input member 20 by the magnetic medium 16, which has a shear stress that can be regulated by the induction of various magnetic fields. The magnetic medium 16 preferably is a magnetorheological fluid ("MR fluid"). However, the magnetic medium 16 can instead be a magnetic powder or other suitable equivalents thereof as desired. In the embodiments described below, the MR coupling 10 has an efficient construction configured for directing a magnetic flux 24 through the magnetic medium 16 so as to engage the coupling 10, minimize its power requirements, and decrease its overall size.

The input member 20 includes a pulley 26, a front-end structure 28, a hub 30, and a first threaded adapter 32. In this embodiment, the first threaded adapter 32 is fastened to a second threaded adapter 34, which is press-fit or otherwise mounted to a pump shaft 36 of the waterpump subassembly 18. It will be appreciated that the input member 20 can have various other suitable constructions so long as the purposes of the invention are fulfilled.

The pulley 26 is driven by an engine crankshaft (not shown) via a belt 38. This pulley 26 is releasably attached to the hub 30 for easily removing the pulley 26 from the MR coupling 10. To that end, a larger or smaller sized pulley can be installed in the MR coupling 10 for use in various packaging applications, e.g. a variety of different sized vehicles. In this embodiment, the pulley 26 is releasably attached to the hub 30 by one or more threaded bolts 40. However, it is contemplated that other releasable fastening means can attach the pulley 26 to the hub 30 or other suitable coupling structure as desired. In an alternative embodiment, the pulley 26 can be fixedly attached to the MR coupling 10, e.g. by a press-fit.

The front-end structure 28 is attached to and rotated by the pulley 26. In particular, the front-end structure 28 includes a body 42 and a cover 44 roll-formed thereto. The body 42 is releasably attached to the hub 30 and the pulley 26 by the threaded bolt 40 and therefore rotates at the same rate as the pulley 26.

Furthermore, the cover 44 has a series of fins 46 for producing a cooling flow of air and rejecting heat in the MR coupling 10. In this respect, the inverted construction of the MR coupling 10 includes the fins 46 extending from the input member 20 rather than the output member 22. Accordingly, the front-end structure 28 cools the MR coupling 10 so long as the pulley 26 is being driven by the engine thereby enhancing the rejection of heat. It is understood that the fins 46 can extend from other suitable portions of the MR coupling 10. For instance as shown in FIG. 3, it is contemplated that both the body 42 and the cover 44 can have fins 46 as desired. The fins 46 are die cast, press-fit, or otherwise suitable formed on the front-end structure 28.

The body 42 and the cover 44 define one continuous working chamber 48 with the magnetic medium 16 therein and the output member 22 rotatable therein. As detailed below, it will be appreciated that the magnetic medium 16 dispenses with the need for a reservoir chamber, valve mechanisms, and other known components of various fan drives.

As shown in FIG. 2, the working chamber 48 has a single-gap construction. Namely, the output member 22 includes an output shaft 50 and a rotor 52 extending orthogonally therefrom. The output shaft 50 is rotatably mounted to the cover 44 by a ball bearing 54 or other suitable attachment. The rotor 52 has an annular land 56a with one output torque surface 58a adjacent to one input torque surface 58b on the body 42. These opposing surfaces 58a, 58b define a single gap in the chamber 48, which contains the portion of the magnetic medium 16 that transfers a substantial amount of the torque between the input member 20 and the output member 22. This operation is detailed below in the description for the electromagnet subassembly 14. As also detailed below and shown in FIG. 3, the working chamber 48 can have a multiple-gap construction with the input member 20 and the output member 22 having a series of opposing lands 56a, 56b with opposing torque surfaces 58a, 58b.

In this embodiment, the MR coupling 10 includes one or more seals 66 for sealing the magnetic medium 16 in the working chamber 48. For instance, the body 42 and the cover 44 have a seal 66 sandwiched therebetween, and the hub 30 and the body 42 also have a seal 66 sandwiched therebetween. The MR coupling 10 can have various other seals 66 in other locations as desired.

Referring to FIG. 2, the MR coupling 10 further includes the electromagnet subassembly 14 for regulating the shear stress of the magnetic medium 16 and transferring torque from the input member 20 to the output member 22. The shear stress of the magnetic medium 16 disposes the MR coupling 10 in an engaged state, a range of partially engaged states, and a disengaged state. In the engaged state, the magnetic medium 16 has a sufficiently high shear stress for transferring a significant amount of torque between the input member 20 and the output member 22. In the disengaged state, the magnetic medium 16 has a sufficiently low shear stress for transferring little to no torque between the input member 20 and the output member 22. Thus, the shear stress of the magnetic medium 16 in the chamber 48, in conjunction with the rotational speed of the input member 20, determines the torque transferred to the output member 22. Put another way, the torque response is a result of the shear stress within the working chamber 48.

To that end, the electromagnet subassembly 14 includes a stationary electromagnet coil 62 for producing a magnetic flux 24 directed between the torque surfaces 58a, 58b and through the magnetic medium 16. In particular, the fan-drive subassembly 12 has a series of ferrous structures and nonferrous structures configured to form a magnetic circuit 64 that directs the magnetic flux 24 through the magnetic medium 16.

With attention to FIG. 2, the ferrous structures include the first adapter 32, the second adapter 34, the output shaft 50, the rotor 52, the land 56a, the body 42, and the pulley 26, which are each comprised of steel or other suitable ferrous materials. In addition, the coil 62 is fixedly mounted to the MR coupling 10 by a ferrous housing 68, which completes the magnetic circuit 64. In this embodiment, the ferrous housing 68 is comprised of steel and is press-fit to a stationary waterpump housing 70.

The nonferrous structures extend between the ferrous structures to prevent a short-circuit condition in the magnetic circuit 64, which could otherwise decrease or eliminate the magnetic flux 24 through the magnetic medium 16. For example, in both the single-gap construction and the multiple-gap construction respectively shown in FIGS. 2 and 3, the hub 30 is comprised of aluminum or another suitable nonferrous material to prevent a short-circuit condition between the first adapter 32 and the pulley 26. Moreover, with regard to the multiple-gap construction, the rotor 52 has one or more ferrous annular lands 56a, which have the output torque surfaces 58a thereon and a nonferrous extension member 72 therebetween. In this way, the magnetic flux 24 is directed through the magnetic medium 16 between each land 56a, 56b. It is understood that otherwise connecting the lands 56a with a ferrous extension member would create a short circuit condition between the rotor 52 and the outermost land 56a. In the same regard, the cover 44 is comprised of a nonferrous material and has one or more opposing ferrous annular lands 56b, which have the opposing torque surfaces 58b thereon. The nonferrous cover 44 is roll-formed around the periphery of the ferrous body 42 for directing the flux 24 between the outermost land 56a on the rotor 52 to the body 42. The lands 56a, 56b are die cast, press-fitted, integrally formed, or otherwise attached to the rotor 52 and the cover 44 by other suitable means.

It is contemplated that the fan-drive subassembly 12 or other portions of the MR coupling 10 can have a variety of other suitable configurations including ferrous structures, nonferrous structures, or any combination thereof so long as the purposes of the claimed invention are accomplished.

The electromagnet subassembly 14 further includes a controller 74, one or more sensors 76, and a power source 78. The controller 74 receives signals from the sensors 76 for detecting various vehicle conditions. The controller 74 processes these signals for determining an amount of electrical power to supply to the coil 62 and then actuates the power source 78 to provide the predetermined amount of power to the coil 62, e.g. by pulse width modulation. In this way, the controller 74 precisely regulates the amount of magnetic flux 24 in the magnetic circuit 64 for controlling the shear stress of the magnetic medium 16 and hence controlling the output of the MR coupling 10.

In this embodiment, the controller 74 receives electrical signals from an output differential speed sensor 90 regarding the engagement between the input member 20 and the output member 22. For instance, a zero speed differential between the input member 20 and the output member 22 can indicate that the MR coupling 10 is in a fully engaged state. As shown in FIG. 2, the output speed differential sensor 90 is sandwiched between the output shaft 50 and the second adapter 34. However, it is understood that the sensor 90 can be installed within the MR coupling 10 in other suitable locations by other means. Furthermore, other sensors 76 can be utilized for detecting engine temperature, fuel economy, emissions or other engine operating conditions.

For instance, in another embodiment, the sensors 76 include a water temperature sensor (not shown) for the engine. The controller 74 has a reference table stored therein for determining a desired engine temperature for a given engine speed. When the controller 74 determines that the engine temperature or engine water temperature is above a predetermined high threshold, the controller 74 actuates the power source 78 to provide full or varying power to the coil 62 to produce a maximum-strength flux so as to increase the shear stress of the magnetic medium 16. Accordingly, the magnetic medium 16 provides a maximum torque response of the rotor 52 for rotating the output shaft 50 and the radiator cooling fan coupled thereto. In other words, the magnetic medium 16 has sufficiently high shear stress for placing the MR coupling 10 in a fully engaged state.

Conversely, if the controller 74 determines that the engine temperature or the engine water temperature is below a predetermined minimum threshold, the controller 74 sends a signal to the power source 78 to activate the coil 62 to a desired pulse width so as to decrease the power supply for the coil 62. In particular, the coil 62 produces a magnetic flux 24 for adjusting the shear stress of the magnetic medium 16 to transfer less torque from the input member 20 to the output member 22. For that reason, the MR coupling 10 is in a partially engaged state for rotating the output member 22 and the radiator cooling fan attached thereto at a slower rate and thus increasing the temperature of the engine.

In this embodiment, the electromagnet subassembly 14 is stationary for thereby minimizing wear on the electrical circuitry therein. Specifically, as introduced above, the waterpump subassembly 18 has a pump housing 70 with a series of through-holes 82 for receiving bolts, such as bolt 40, or other suitable fasteners and fixedly attaching the pump housing 70 directly to the engine block face (not shown) or other suitable vehicle fixture. The pump housing 70 has the electromagnet subassembly 14 and its electrical circuitry mounted therein by the steel housing 68. In this respect, the electrical portion of the MR coupling 10 is not physically attached to the moving drive components but rather is mounted to a stationary fixture. As such, there is no tethered wire harness and no actuator bearing. This stable and robust construction is beneficial for increasing the life of the MR coupling 10. In addition, the electromagnet coil 62 can be more easily replaced, and thus lower costs related to service and warranty are realized.

Furthermore, this construction includes a substantial portion of the actuator components as integral parts of the engine-side of the MR coupling 10. This feature leads to a lower overhanging mass on the drive components, which then leads to higher system resonant frequency and possible improvements in waterpump durability. Also, this construction has a compact packaging that increases the available space within an engine compartment.

It will further be appreciated that the MR coupling 10 eliminates a substantial number of pumping mechanisms typically integrated within conventional viscous couplings. Thus, the MR coupling 10 has an inherently stable construction that can also be quickly manufactured at low costs.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A magnetic fan coupling comprising:
   a fan-drive subassembly having a drivable input member and an output member rotatably mounted substantially in said input member, said input member having a plurality of external fins for producing a flow of air that cools said magnetic fan coupling when said input member is driven to rotate and also rejecting heat from said magnetic fan coupling;
   a magnetic medium having an associated shear stress and disposed within a substantially closed and continuous work chamber defined between said input member and said output member; and
   an electromagnet subassembly having a stationary electromagnet coil for adjusting said shear stress of said magnetic medium and also regulating any torque transferred between said input member and said output member;
   wherein said input member comprises (i) a pulley drivable by a belt engaged with a vehicle engine and (ii) a front-end structure rotatable via said pulley;
   wherein said front-end structure includes a body and a cover cooperatively defining said work chamber such that said magnetic medium and at least part of said output member are situated therein;
   wherein at least one of said body and said cover includes said plurality of external fins; and
   wherein said work chamber is offset from said stationary electromagnet coil along a longitudinal axis of said output member.

2. A magnetic fan coupling according to claim 1, wherein said fan-drive subassembly comprises a magnetic circuit for thereby directing a magnetic flux through said magnetic medium.

3. A magnetic fan coupling comprising:
   a fan-drive subassembly having a drivable input member and an output member rotatably mounted substantially in said input member;
   a magnetic medium having an associated shear stress and disposed within a substantially closed and continuous work chamber defined between said input member and said output member; and
   an electromagnet subassembly having a stationary electromagnet coil for adjusting said shear stress of said magnetic medium and also regulating any torgue transferred between said input member and said output member;

wherein said input member has a plurality of external fins for producing a flow of air that cools said magnetic fan coupling when said input member is driven to rotate;

wherein said input member is adapted for having any one of a series of different-sized pulleys selectively installed therein for use in one of a plurality of different-sized vehicles;

wherein said input member includes a removable pulley;

wherein said removable pulley is releasably attached to said magnetic fan coupling by a bolt fastener;

wherein said magnetic fan coupling further comprises a front-end structure of said input member that is rotatable via said removable pulley;

wherein said removable pulley is rotatably mounted to a stationary waterpump housing and operable to rotate a waterpump shaft;

wherein said front-end structure comprises a body and a cover coupled to said body for thereby defining a work chamber with said magnetic medium and at least part of said output member situated therein;

wherein said magnetic medium comprises at least one of a magnetorheological fluid and a magnetic powder;

wherein said work chamber is offset from said stationary electromagnet coil along a longitudinal axis of said shaft;

wherein said plurality of external fins are located on at least one of said body and said cover of said input member for producing said flow of air that cools and improving heat rejection therein;

wherein said output member has an output shaft and a rotor;

wherein said output shaft is rotatably mounted to said cover of said input member;

wherein said rotor extends from said output shaft and into said work chamber;

wherein said fan-drive subassembly has one of a single-gap construction and a multiple-gap construction;

wherein said single-gap construction with said rotor has one annular land for receiving torque from said front-end structure by said magnetic medium;

wherein said multi-gap construction with said rotor has a nonferrous extension member and a series of ferrous lands extending therefrom for directing a magnetic flux through at least one opposing ferrous land extending said front-end structure that comprises a nonferrous material;

wherein said fan-drive subassembly comprises a magnetic circuit for directing a magnetic flux through said magnetic medium;

wherein said magnetic circuit includes said stationary electromagnet coil, a steel housing, and at least one steel adapter with each of said output shaft, said rotor, said body, and said removable pulley comprising steel;

wherein said body and said removable pulley are mounted to said at least one steel adapter and a nonferrous hub;

wherein said at least one adapter is attached to said waterpump shaft;

wherein said electromagnet subassembly further comprises a controller, at least one sensor, and a power source;

wherein said at least one sensor is operable to detect at least one vehicle condition and generate at least one signal in response thereto;

wherein said at least one sensor includes an output differential speed sensor;

wherein said controller is operable to process said at least one signal and selectively actuate said power source accordingly so as to provide a predetermined amount of power to said stationary electromagnet coil; and wherein said controller is operable to actuate said power source so as to provide a predetermined pulse width modulation (PWM) of power to said stationary electromagnet coil.

* * * * *